H. H. FEBREY.
RAIL BOND.
APPLICATION FILED AUG. 7, 1917.
1,301,239.
Patented Apr. 22, 1919.
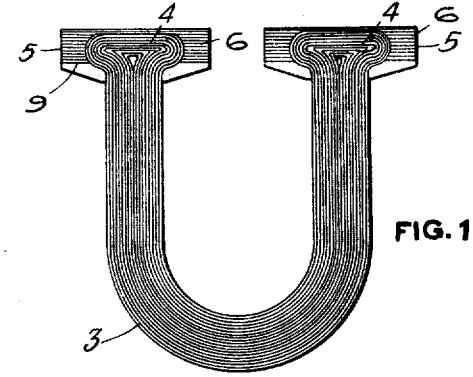
FIG. 1
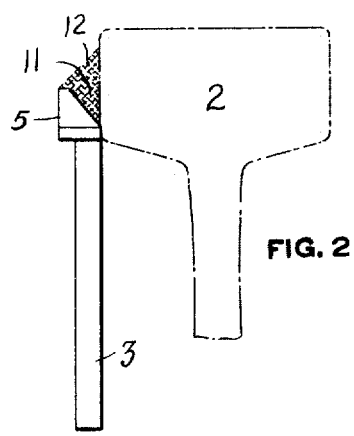
FIG. 2
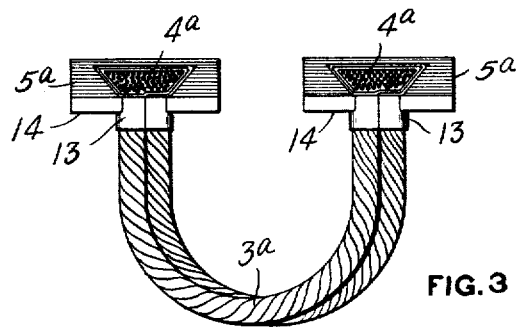
FIG. 3
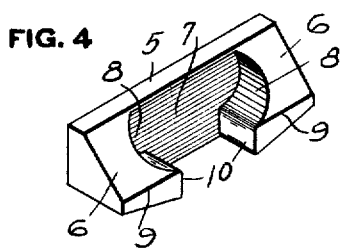
FIG. 4
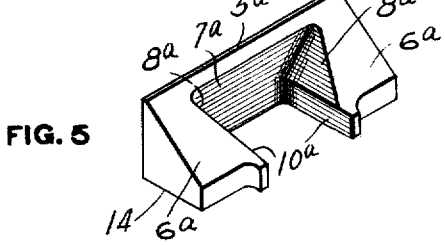
FIG. 5
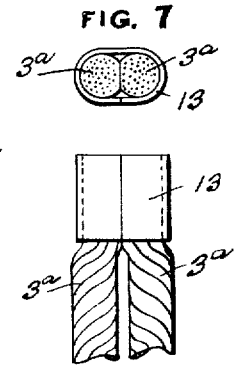
FIG. 7
FIG. 6
FIG. 8
FIG. 9
WITNESSES
R. S. Little
W. T. Holman
INVENTOR
Harold H. Febrey
by D. Allania
his Attorney

UNITED STATES PATENT OFFICE.

HAROLD H. FEBREY, OF NEWARK, NEW JERSEY, ASSIGNOR TO THE AMERICAN STEEL AND WIRE COMPANY OF NEW JERSEY, OF HOBOKEN, NEW JERSEY, A CORPORATION OF NEW JERSEY.

RAIL-BOND.

1,301,239.   Specification of Letters Patent.   Patented Apr. 22, 1919.

Application filed August 7, 1917. Serial No. 184,879.

*To all whom it may concern:*

Be it known that I, HAROLD H. FEBREY, a citizen of the United States, and resident of Newark, in the county of Essex and State of New Jersey, have invented certain new and useful Improvements in Rail-Bonds, of which the following is a specification.

My invention relates to the construction of rail bonds, and more particularly to the construction and application of rail bonds of the type wherein the rail bond terminals are united to the track rails by welding, brazing, or analogous manner.

One object of this invention is to provide a rail bond having terminals of novel construction forming improved means whereby the rail bonds are applied to the rails and wherein great strength is combined with superior electrical conductivity between the bond and connected rail.

Another object of the invention is to provide a rail bond having novel means whereby the terminals are first mechanically attached to the ends of the rail bond conductor and a terminal and its attached end of the conductor are united to each other and to the track rail or to a third rail in applying the rail bond to the rail.

A further object of the invention is to provide a rail bond having a flexible copper conductor and terminals of a dissimilar metal connected thereto in such manner that the union of the rail bond to the rails by welding is effected in a cheap and economical manner.

A still further object of my invention is the provision of a rail bond having the novel features of construction and application shown in the drawings, to be fully described hereinafter and to be particularly pointed out in the appended claims.

Referring now to the drawings forming part of this specification, Figure 1 is a plan, showing a rail bond embodying a laminated conductor having terminals mechanically attached thereto, in accordance with my invention.

Fig. 2 is a side elevation showing the rail bond of Fig. 1 as applied in forming a union between the terminals, the conductor ends, and the engaging face of a track rail.

Fig. 3 is a plan similar to that shown in Fig. 1, showing a modified form of bond employing a flexible wire cable in forming the rail bond conductor and having terminals constructed and mechanically attached to the ends of the conductor in accordance with the invention.

Fig. 4 is a perspective view showing, in detail, the beveled and recessed rail engaging face of the bond terminal of Figs. 1 and 2.

Fig. 5 is a perspective view, similar to that of Fig. 4, showing details in the construction of the beveled and recessed rail engaging face of the modified form of terminal employed with the rail bond of Fig. 3.

Fig. 6 is a plan and Fig. 7 is an end elevation showing the end of the bond conductor of Fig. 3 after application of the thimble thereto.

Fig. 8 is a side elevation showing the thimble incased end of the bond conductor as inserted in the terminal slot or recess.

Fig. 9 is a side elevation, similar to Fig. 8, showing the thimble incased end of the conductor of Fig. 8, as flattened or expanded in securing the terminal on the conductor end, in preparation for the later welding or brazing operation.

In Fig. 2, of the accompanying drawings, the numeral 2 designates the head of a steel track rail having a rail bond united therewith in accordance with my invention.

The rail bond comprises a laminated conductor 3 formed of flat metal strips and having enlarged ends 4—4. A terminal 5, which preferably is formed of a ferrous metal is provided on each end of the conductor, the terminals preferably being made of steel of substantially the same composition and electrical conductivity as the rails 2.

Each of the terminals 5, as will be seen in Figs. 1, 2, and 4, has a chamfered or beveled face 6, and in this beveled face is a transverse recess or slot 7 having upwardly and outwardly curved sides 8, 8, so that the slot 7 flares upwardly from the lower edge 9 of the beveled face 6. The restricted portion 10 of the upwardly flaring slot is of a width equal to that of the conductor 3, and the enlarged ends 4, 4, on the conductor are adapted to snugly fit the recesses or slots 7, as shown in Fig. 1. Preferably, although not necessarily, the enlarged ends 4 of the conductor are beveled on the rail engaging face thereof at the same angle as the beveled rail engaging face 6 of the terminals 5 and flush with such face.

In the modified bond construction of

Figs. 3 and 5, the ends of the conductor 3ª, which are formed of double strands of wire, preferably are bound together by means of a thimble or thin strip of metal (preferably copper) 13 wound around the ends of the conductor in the manner shown in Figs. 6 and 7, and the so incased ends 4ª, 4ª of the conductor are spread or otherwise enlarged so as to tightly fit within the upwardly tapering recess or slot 7ª in the beveled rail engaging face 6ª of the terminals 5ª, 5ª (see Figs. 5, 8 and 9). Preferably any excess metal will be cut off or otherwise removed from the end of the conductor after the flattening or expanding operation, so that the end of the conductor will be flush with the beveled surface 6ª of the bond terminal 5ª. The lugs on opposite sides of the slot in the rail engaging side of the terminals will be hammered or bent inwardly, as is shown in Fig. 3, to narrow the width of the slot and aid in mechanically holding the thimbles in place in the slots or recesses 7ª. The thimbles 13 on the enlarged ends 4ª of the conductors 3ª are desirably made of such length as to extend downwardly for a short distance below the lower surface 14 of the terminals, at the contracted end 10ª of the upwardly and outwardly tapering slot or recess 7ª in the manner shown in Fig. 3. Obviously, however, the thimbles 13 may be made flush with the lower surface 14 of the terminals or may be omitted entirely when desired.

In mechanically attaching the terminals 5 to the ends of the conductor 3, the enlarged ends 4 of the terminals will be forced tightly into the transverse slots 7 so as to be tightly held therein by friction, and in uniting the rail bonds to the rails the beveled face 6 of the terminals co-acts with the adjacent face of the rail 2 to form a V-shaped groove 11 having its apex at the lower side of the groove, this groove being employed to receive additional metal, in uniting the rail bond to the rail by welding, brazing, or similar manner. (See Fig. 2.)

Preferably the rail bonds will be welded to the rail although they may be brazed or soldered. When the rail bond is being welded it will first be held in position against the face of the rail, while the terminals 5, the enlarged ends 4 of the conductor which are seated within the slot 7 in the terminals, and the adjacent face of the rail 2 are being heated, by means of an electric current (resistance or arc), oxy-acetylene blow-torch, or other approved manner, to a welding temperature.

After the parts being united become highly heated, a metal wire or pencil is introduced into the zone of heating and is melted therein so as to supply additional metal in uniting the rail bond to the rail 2, and, desirably, this added metal 12 will be built up on top of the upper surface of the terminals 5 to provide added surface and increase the strength and electrical efficiency of the union between the rail bond and rail. But a secure joint, with sufficient cross section for electric conduction, may be obtained by merely filling in the triangular space to the level of the top of the terminal 5.

The rail bond of Figs. 3 and 5 is applied to the track rail in the same manner as has been described in connection with the rail bond of Figs. 1, 2, and 4.

The advantages of my invention will be apparent to those skilled in the art. By constructing the rail bonds as shown and described, the expense and care required in welding or brazing the terminals to the conductor in one operation and then again welding or uniting the terminals to the rails are avoided and rendered unnecessary. By forming a union between the terminals, the ends of the conductor and rail in a single operation the cost of bonding the track rails is greatly reduced, while by uniting the rails and the rail bonds in the particular manner shown and described, the strength and durability of the bonds and the electrical efficiency of the union are greatly increased. By using iron or steel in making the terminals the cost of the rail bonds is reduced without reduction in the cross section of copper through which the current passes.

Modifications in the construction and arrangement of the parts may be made within the scope of the invention as defined in the appended claims. The materials used in making the rail bonds may be changed and the way in which the bonds are united to the rails may be varied and other changes may be made.

I claim:—

1. A rail bond comprising a conductor and terminals on the ends thereof, said terminals having a transverse slot in one face thereof in which said ends are seated to mechanically secure the terminals on the conductor and enable each conductor end, its attached terminal, and a rail, to be united, each to the other, with the aid of heat in applying the rail bonds to the rails.

2. A rail bond comprising a conductor and terminals on the ends thereof, said terminals having a beveled rail engaging face co-acting with the rail to form a pocket therebetween, and a transverse slot in said beveled face in which the conductor ends are seated to mechanically secure the terminals on the conductor and enable the conductor end, its attached terminals, and a rail, to be united, each to the other, with the aid of heat in applying the rail bonds to the rails, and said pocket being adapted to receive molten metal in the rail bonding operation.

3. A rail bond comprising a copper conductor and steel terminals, said terminals having a transverse slot in the rail engaging face thereof to mechanically secure the terminals on the ends of the conductor and enable each conductor end, its terminal, and a rail, to be united, each to the other, with the aid of heat in applying the rail bond to the rails.

4. A rail bond comprising a flexible copper conductor and steel terminals, said terminals having transverse slots in the rail engaging face thereof in which the ends of said conductor are seated to mechanically secure the terminals to the conductor and enable each conductor end, its terminal, and a rail, to be united, each with the other, when heated in the bond applying operation.

5. A rail bond comprising a conductor having enlarged ends and terminals having transverse slots in the rail engaging face thereof, said enlarged ends being seated in said slots to mechanically secure the terminals to the conductor and enable each enlarged conductor end, its terminal, and a rail, to be united, each with the other, by the application of heat in the bond applying operation.

6. A rail bond comprising a conductor having enlarged ends, a thimble on said enlarged ends, and terminals having transverse slots in the rail engaging face thereof, said thimbles being seated in said slots to mechanically secure the terminals to the conductor and enable each conductor end, its thimble and terminal, and the rails, to be united, each with the other, by the application of heat in the bond applying operation.

7. In a rail bond comprising a conductor having enlarged ends and terminals having a beveled rail engaging face, said beveled faces having a transverse slot therein and the enlarged ends of said conductor being seated in said slots to mechanically secure the terminals to the conductor and enable each enlarged conductor end, its terminal, and a rail, to be simultaneously united, each with the other, by the application of heat in the bond applying operation, and said beveled faces on the terminals co-acting with the opposite face of the rails to form a pocket to receive molten metal added thereto in uniting the rail bond and rails.

8. A rail bond comprising a conductor formed of copper and having expanded ends and terminals formed of ferrous metal, said terminals having transverse slots in one face thereof in which the expanded ends of said conductor are mechanically secured.

9. A rail bond comprising a conductor formed of copper and having enlarged ends and terminals formed of ferrous metal, said terminals having transverse slots in the rail engaging face thereof and the enlarged ends of the conductor being mechanically secured in said slots.

10. A rail bond comprising a conductor formed of copper and terminals formed of ferrous metal, said terminals having transverse slots in the rail engaging face thereof, in which the ends of the conductor are mechanically fastened and arranged to permit contact between the conductor ends and said rails.

11. A rail bond comprising a flexible conductor and rigid terminals formed of ferrous metal, said terminals having transverse slots in which the ends of the conductor are mechanically secured and arranged to permit engagement of the conductor ends with the rails in the application of the bonds to said rails.

12. A rail bond comprising a laminated copper conductor and rigid terminals formed of ferrous metal, said terminals having a transverse slot in one side face thereof in which the ends of said conductor are mechanically fastened.

13. A rail bond comprising a flexible conductor having enlarged ends and rigid terminals formed of ferrous metal, said terminals having a lengthwise tapering, transverse slot in one side face thereof in which the ends of said conductor are mechanically fastened.

14. A rail bond comprising a flexible conductor having enlarged ends and rigid terminals formed of ferrous metal, said terminals having a lengthwise tapering, transverse slot in the rail engaging face thereof in which the ends of said conductor are mechanically secured.

In testimony whereof I have hereunto set my hand.

HAROLD H. FEBREY.

Copies of this patent may be obtained for five cents each, by addressing the "Commissioner of Patents, Washington, D. C."